Sept. 24, 1968     F. R. GRUNER     3,402,823
DOUBLE EDGE CENTRIFUGAL PLOW
Filed July 21, 1967     2 Sheets-Sheet 1
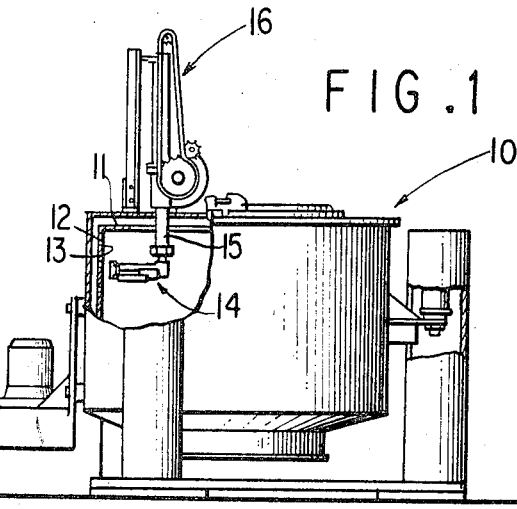
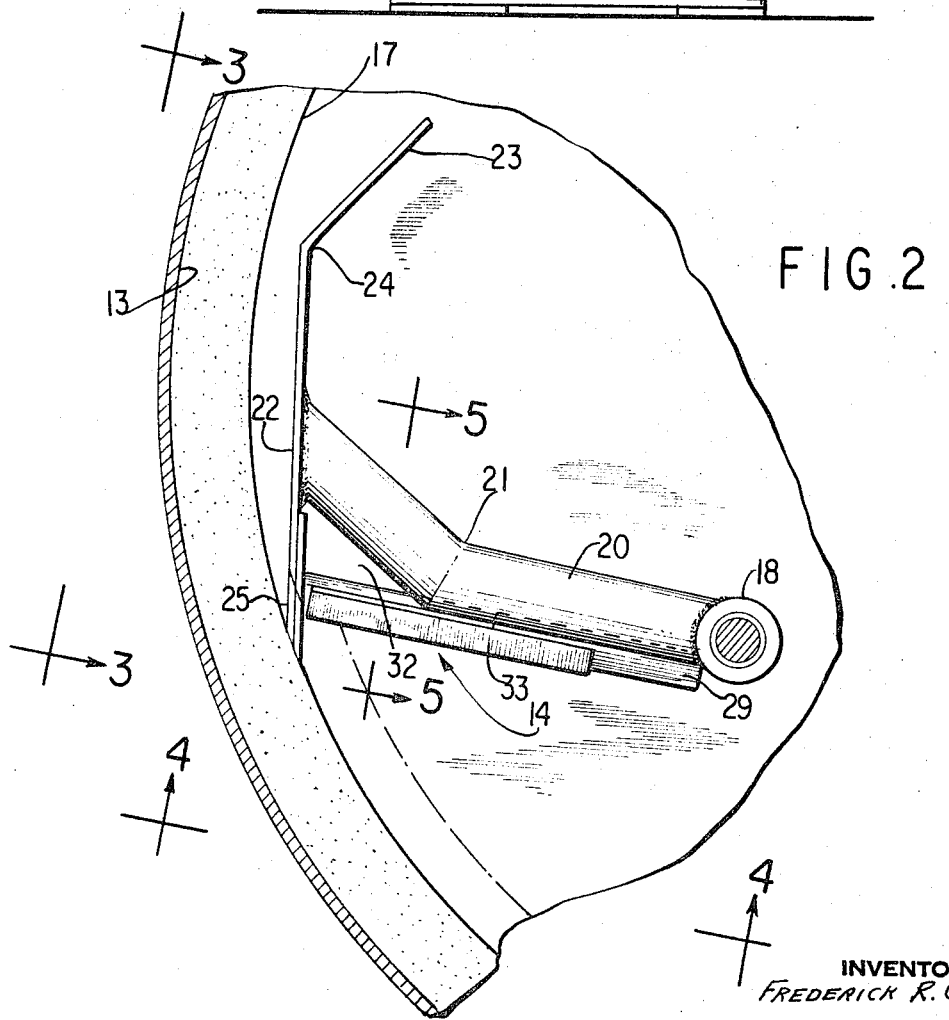
INVENTOR
FREDERICK R. GRUNER
BY
Smythe & Moore
ATTORNEYS

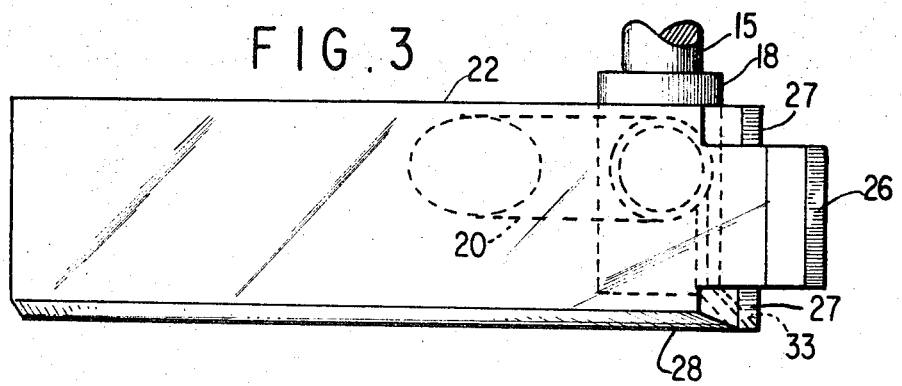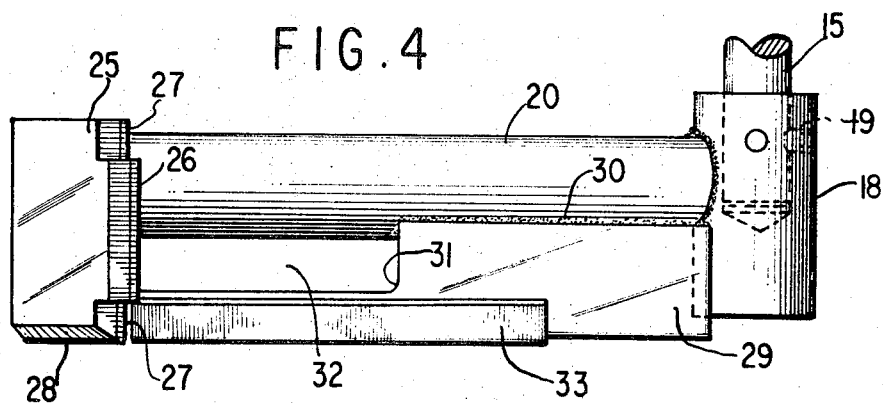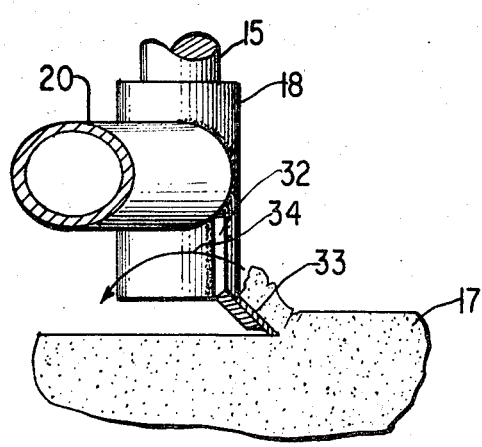

United States Patent Office 3,402,823
Patented Sept. 24, 1968

3,402,823
DOUBLE EDGE CENTRIFUGAL PLOW
Frederick R. Gruner, Moline, Ill., assignor to Ametek, Inc., New York, N.Y., a corporation of Delaware
Filed July 21, 1967, Ser. No. 655,158
6 Claims. (Cl. 210—375)

ABSTRACT OF THE DISCLOSURE

A plow blade assembly for removing the filter cake accumulated on the inner wall surface of the rotary separator drum of a centrifugal separator having two cutting edges, with said cutting edges disposed at approximately right angles to each other and the cutting edge parallel to the inner wall surface having set-back portions at its outer edges.

---

The present invention relates to the removal of accumulated cake in a centrifugal separator and more particularly to the plow blade structure for removing the cake from the inner wall surface of the separator drum.

During the centrifuging operation as carried out in the rotary separator drum of a centrifugal separator, solids in the form of a filter cake will accumulate on the inner wall surface of the rotating drum. The filter cake is then scraped off by a scraping or peeling knife or blade while the drum continues rotating. The peeling knife is generally termed a "plow blade" and is mounted on a suitable apparatus for movement in a direction parallel to the wall surface, or radially outwardly toward the wall surface and substantially perpendicular thereto. Different types of plow blades must be employed depending upon the movement of the plow blade with respect to the inner wall surface of the drum. In the conventional form of a plow blade, the cutting edge is substantially parallel to the inner wall surface and the plow can be moved in a direction parallel to the wall surface. However, such a plow blade does not give completely satisfactory results since the cake is not scraped or peeled from the wall surface in the most efficient manner when the plow moves downwardly in a vertical direction parallel to the inner wall surface.

One of the objects of the present invention is to provide an improved plow blade assembly for removing the cake from the rotary separator drum of a centrifugal separator.

Another object of the invention is to provide a plow blade assembly having a pair of cutting edges at right angles to each other.

A still further object of the invention is to provide a plow blade assembly which will effectively remove the cake from the inner wall surface of a drum when the plow blade is moved either parallel or perpendicular to the inner wall surface.

In one aspect of the invention, the plow blade assembly may comprise a hub which is positioned inwardly and substantially parallel to the inner wall surface of the separator drum. A mounting arm extends radially outwardly from the hub toward the drum inner wall surface. A vertical plow blade is mounted on the outer end of the mounting arm, the plow blade being substantially parallel to the drum inner wall surface and perpendicular to the mounting arm. The blade has a length substantially equal to that of the mounting arm and has a vertical cutting edge on its forward end. The rearward portion of the cutting blade is bent inwardly toward the hub. The vertical blade cutting edge has its central portion projecting forwardly of its outer end portions. A horizontally extending bracket is mounted on the lower portion of the mounting arm and substantially parallel to the arm. The bracket extends outwardly toward the vertical plow blade and has a second or horizontal plow blade mounted on the bracket. The plow blade has a cutting edge which is substantially horizontal and at right angles to the cutting edge of the first or vertical plow blade. There is an opening in the bracket at its outer end above the second blade and adjacent the first blade to permit cut cake material to pass therethrough. The outer end of the mounting arm is bent rearwardly with respect to the cutting edges.

Other objects, features and advantages of the present invention will become apparent from the following description and accompanying drawings which are merely exemplary.

In the drawings:

FIG. 1 is a schematic elevational view of a centrifugal separator with a portion of the separator drum cut away to show a plow blade assembly mounted therein;

FIG. 2 is an enlarged top plan view of the separator drum of FIG. 1 showing the plow blade assembly in cutting relation to the accumulated cake;

FIG. 3 is a side elevational view of the plow blade assembly of FIG. 2 taken in the directions of arrows 3—3;

FIG. 4 is a front elevational view of the plow blade assembly of FIG. 2, taken in the direction of arrows 4—4;

FIG. 5 is a sectional view taken along the line 5—5 of FIG. 2; and

FIG. 6 is an elevational view of a portion of the cake being scraped by the plow blade, showing the shape of the cut made by the vertical plow blade.

Referring to the drawings, wherein like reference numerals indicate the same parts throughout the various views, a specific embodiment of the invention will be described in detail.

In FIG. 1 there is illustrated a centrifugal separator 10 which incorporates the present invention. Separator 10 comprises the customary drum 11 which is rotatable about a vertical axis. The drum 11 has a peripheral side wall 12 and an inner wall surface 13. The structure for mounting and driving a rotary drum is well known in the art and need not be described in detail.

The plow blade assembly is indicated generally at 14, the assembly being mounted on the lower end of shaft 15 extending downwardly from a mechanism generally indicated at 16 for moving the plow blade assembly with respect to the inner wall surface 13 of the drum.

As shown in FIG. 2, the inner wall surface 13 of the rotary drum has an accumluation of solids or filter cake thereon as indicated at 17. The plow blade assembly is employed to scrape or peel the accumulated cake from the inner wall surface. The plow blade assembly may also comprise structure for collecting the peeled or scraped cake and discharging the cake outwardly of the rotating drum in a suitable receptacle or container.

The plow blade assembly 14 comprises a hub 18 which is secured on the lower end of shaft 15 by means of set screws 19 or any other suitable fastening arrangement.

A hollow tubular mounting arm 20 is welded or fastened to the outer surface of hub 18 and extends radially outwardly therefrom toward the wall of the drum. The mounting arm can be bent rearwardly at 21, for example, at about a 30-degree angle relative to arm 20.

Welded on the outer end of the mounting arm is a vertical plow blade 22 which has a length substantially equal to that of mounting arm 20 and has its rearward portion 23 bent inwardly at 24 toward the hub 18. The forward or leading portion 25 of plow blade 22 comprises a central cutting edge 26 which projects forwardly of the end cutting edges 27. A cutting edge 28 may also be formed on the bottom edge of plow blade 22 adjacent the forward portion 25. The cutting edges 26 and 27 may be detachably mounted on the plow blade 22 so as to be readily replaceable or easily removable for resharpening.

A bracket 29 is welded along the lower portion of the mounting arm as indicated at 30, said bracket extending radially outwardly and almost into contact with vertical plow blade 22. The upper corner of the outer end of bracket 30 is removed to form a notch 31 which, together with mounting arm 20, forms an opening 32 for the passage of scraped filter cake in a manner which will be presently described. Detachably mounted along the lower portion of bracket 29 is a horizontal cutting edge means 33. The cutting edge means 33 is at right angles to cutting edges 26 and 27 and, as may be seen in FIG. 1, is even with the outer cutting edges 27.

The presence of the two cutting edges, which are at right angles to each other, enables the plow blade assembly of the present invention to be moved either vertically or horizontally with respect to the rotary drum as illustrated in FIG. 1. As the plow blade assembly is moved vertically and the drum continues to rotate, the accumulated cake will be cut by horizontal cutting edge means 33 in the manner shown in FIG. 5. The cut cake will then pass through opening 32 as indicated by arrow 34. At the same time, if the vertical cutting edge is positioned sufficiently close to the inner wall surface, the vertical cutting edge will cut the cake in the manner shown in FIG. 6. It will be apparent that a more effective removal of the cake can be achieved by moving the plow blade assembly both vertically and horizontally. This can be accomplished by the mechanism illustrated at 16 in FIG. 1.

Thus, it can be seen that the present invention involves an effective plow blade assembly for removing accumulated filter cake from the seaprator drum of a centrifugal separator wherein the plow blade assembly can be moved either vertically or horizontally or a combination of the two movements. The shapes of the cutting edges contribute greatly to the efficiency with which cake is peeled or scraped by this plow blade assembly.

It is to be understood that changes may be made in the various details of construction and arrangement of parts without departing from the spirit of the invention except as defined in the appended claims.

What is claimed is:

1. In a plow blade assembly for removing cake accumlated on the inner wall surface of a rotary separator drum of a centrifugal separator, the combination including hub means positioned inwardly and substantially parallel to the inner wall surface of the separator drum, mounting arm means extending radially outwardly from said hub means toward said drum inner wall surface, first plow blade means angularly disposed to and mounted on the outer end of said mounting arm substantially parallel to said drum inner wall surface and having cutting edge means thereon substantially parallel to said drum inner wall surface, separate bracket means mounted on the lower portion of said mounting arm in parallel relation and extending to said first plow blade means, said bracket means having at least a portion thereof vertically spaced from said mounting arm so as to provide passage means for scraped filter cake, and second plow blade means having cutting edge means thereon fastened to said bracket means and extending outwardly to said first plow blade means cutting edge with said first and second blade cutting edge means being at substantially right angles to each other.

2. A plow blade assembly as claimed in claim 1 wherein said passage means in said bracket means is at its lower end above the second blade means and adjacent said first blade means for cut filter cake to pass therethrough.

3. A plow blade assembly as claimed in claim 1 wherein the cutting edge of said first blade means has its central portion projecting forwardly of its outer portions.

4. A plow blade assembly as claimed in claim 3 wherein said central portion projects forwardly of said second blade cutting edge means.

5. A plow blade assembly as claimed in claim 1 wherein said mounting arm means comprises a tubular member and is bent rearwardly with respect to said cutting edge means.

6. A plow blade assembly as claimed in claim 1 wherein said first plow blade means has a length substantially equal to said mounting arm means.

References Cited

UNITED STATES PATENTS

| | | | |
|---|---|---|---|
| 1,388,173 | 8/1921 | Daniels | 210—375 |
| 2,685,968 | 8/1954 | Hertrich | 210—375 |
| 3,279,612 | 10/1966 | O'Conor | 210—376 X |
| 3,329,275 | 7/1967 | O'Conor | 210—375 |

FOREIGN PATENTS 906,269  9/1962  Great Britain.

OTHER REFERENCES

German printed application No. 1,154,401, September 1963.

REUBEN FRIEDMAN, *Primary Examiner.*

J. L. DE CESARE, *Assistant Examiner.*